(12) United States Patent
Maejima et al.

(10) Patent No.: US 8,335,430 B2
(45) Date of Patent: Dec. 18, 2012

(54) OPTICAL DATA TRANSMISSION APPARATUS

(75) Inventors: Yoji Maejima, Otsu (JP); Masanori Hino, Osaka (JP)

(73) Assignee: Hokuyo Automatic Co., Ltd., Osaka (JP)

( * ) Notice: Subject to any disclaimer, the term of this patent is extended or adjusted under 35 U.S.C. 154(b) by 387 days.

(21) Appl. No.: 12/827,723

(22) Filed: Jun. 30, 2010

(65) Prior Publication Data

US 2011/0002694 A1  Jan. 6, 2011

(30) Foreign Application Priority Data

Jul. 1, 2009  (JP) ................... 2009-156775

(51) Int. Cl.
*H04B 10/24* (2006.01)
*H04B 10/00* (2006.01)
*H04B 10/12* (2006.01)

(52) U.S. Cl. .......... 398/41; 398/143; 398/119; 398/125; 398/128

(58) Field of Classification Search .............. 398/41, 398/118, 119, 124–127, 142, 143
See application file for complete search history.

(56) References Cited

U.S. PATENT DOCUMENTS

| 5,963,349 A * | 10/1999 | Norte ............................ 398/42 |
| 6,965,713 B2 * | 11/2005 | Sidorovich ..................... 385/31 |
| 7,826,702 B2 * | 11/2010 | Dawes ........................... 385/129 |
| 2003/0011850 A1 * | 1/2003 | Sidorovich et al. ............ 359/172 |

FOREIGN PATENT DOCUMENTS

| JP | 8-335911 | 12/1996 |
| JP | 11-007027 | 1/1999 |
| JP | 2000-091996 | 3/2000 |
| JP | 2000-244409 | 9/2000 |
| JP | 2005-286704 | 10/2005 |
| JP | 2008-118542 | 5/2008 |

* cited by examiner

*Primary Examiner* — Dalzid Singh
(74) *Attorney, Agent, or Firm* — Pillsbury Winthrop Shaw Pittman, LLP

(57) ABSTRACT

An optical data transmission apparatus is provided, in which a first communication unit 101 and a second communication unit 102 arranged to freely move relatively to each other each include an optical signal transmission unit having a laser diode 120 for emitting single-mode light, a multi-mode optical fiber 111 for guiding a single-mode optical signal output from the laser diode 120, converting the single-mode optical signal into a multi-mode optical signal, and outputting the multi-mode optical signal, an optical lens 112 for forming the optical signal output from the multi-mode optical fiber 111 into parallel light, and a first polarization element for passing the optical signal polarized in a predetermined direction out of optical signals output from the optical lens 112.

9 Claims, 12 Drawing Sheets

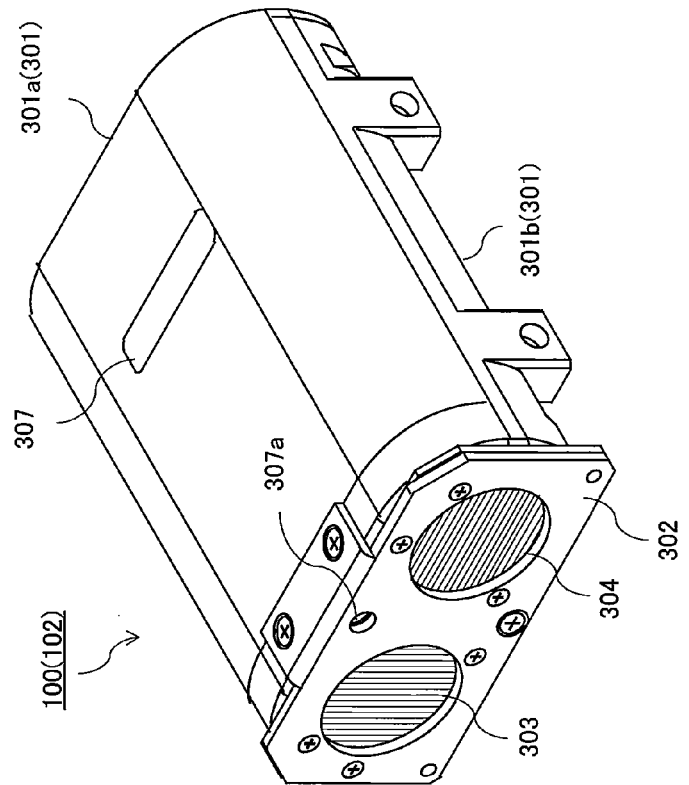
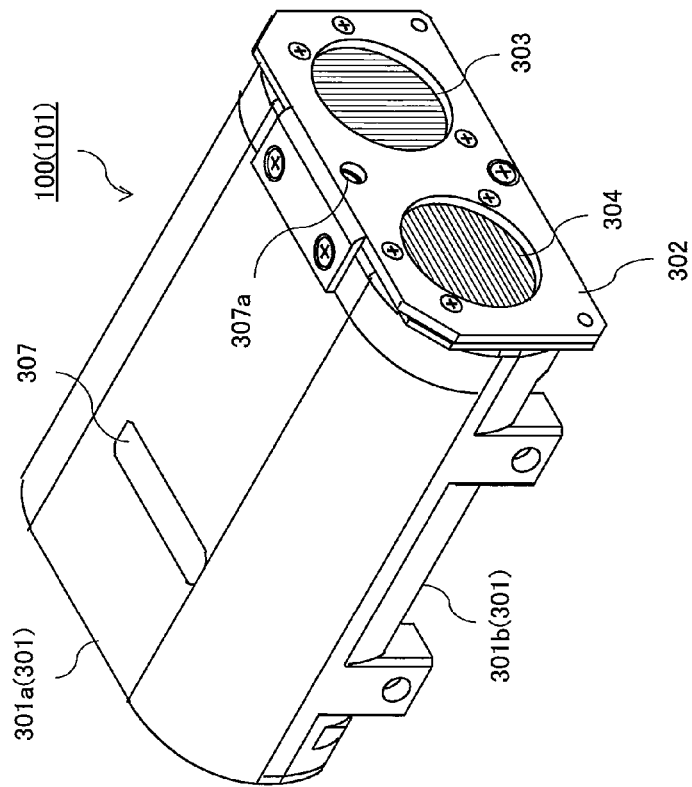
Fig. 7

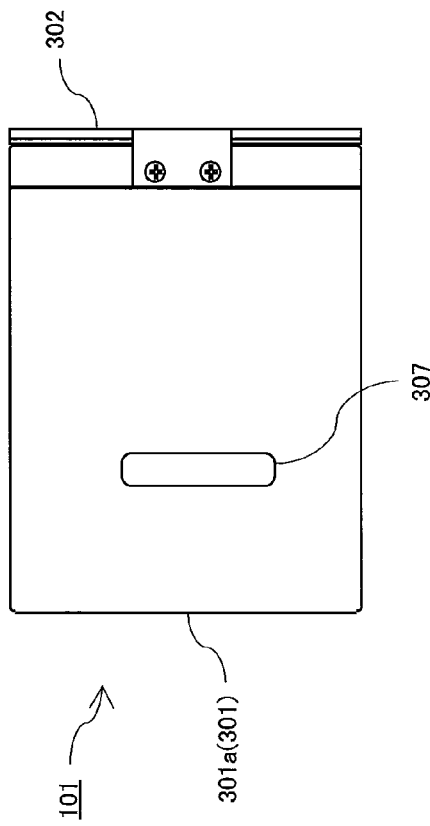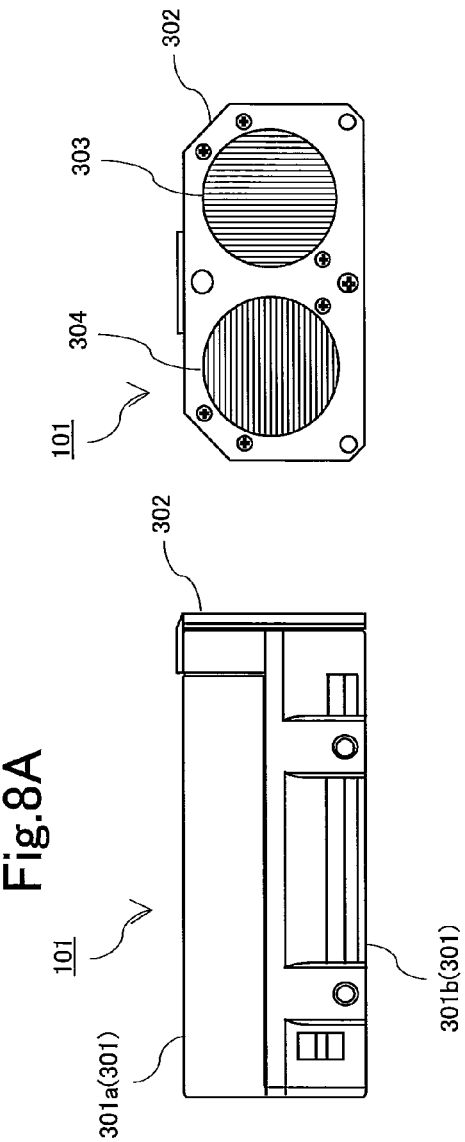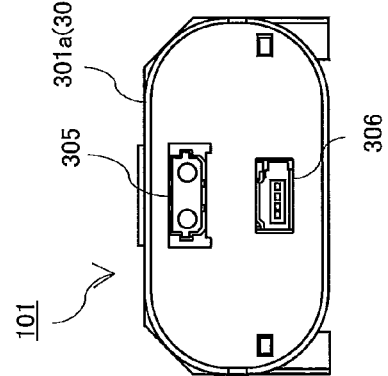

OPTICAL DATA TRANSMISSION APPARATUS

This application is based on an application No. 2009-156775 filed in Japan, now patent No. 4495774, the contents of which are hereby incorporated by reference.

BACKGROUND OF THE INVENTION

1. Field of the Invention

The present invention relates to an optical data transmission apparatus, and more particularly relates to an optical data transmission apparatus suitable for a servo communication system in which a plurality of servo control units for controlling servo motors are connected by the multi-drop method to a full-duplex communication line connected to a system control apparatus, and the servo control unit controls the servo motor upon receiving a control instruction from the system control apparatus via the communication line, and transmits a control state thereof to the system control apparatus via the communication line.

2. Description of the Related Art

In the field of wireless data communication, a transmission signal output from a first communication unit sometimes interferes with a reception signal output from a second communication unit in communication, and a reception unit of the first communication unit is unable to satisfactorily receive the signal. In order to overcome the above drawback and achieve stable full-duplex communication, the transmission signal and the reception signal, which are electromagnetic waves, use different frequencies and different modulation/demodulation methods.

In general, the FSK (Frequency Shift Keying) method is often employed in the digital modulation method. Since the amplitude of a signal does not carry any information in the FSK method, a transmission circuit can output the signal with the maximum power at all times. Therefore, a reception circuit does not need to have an AGC circuit or the like to control a gain. A limiter circuit and a saturable amplification circuit are provided to simply amplify the reception signal.

In the FSK method, no amplitude component is necessary. Accordingly, the FSK method has a characteristic that, when a strong signal is received, a weaker signal in the same frequency is masked. In general, a weak reception signal is often an undesired interference signal. Therefore, the FSK method having high performance in eliminating a weak signal (co-channel selectivity) is often employed as a highly reliable method.

In addition to the above method, the PSK (Phase Shift Keying) method using phase modulation and the ASK (Amplitude Shift Keying) method using amplitude modulation are also available. In these modulation methods, any one of the phase, the frequency, and the amplitude of a reference carrier in a carrier frequency fc is shifted based on a baseband signal.

In order to achieve high-speed data communication, a carrier frequency fc sufficiently higher than a data frequency fs is required. Therefore, a broadband property at a high frequency is necessary.

When the generally available FSK method is employed to perform communication at a relatively low transmission rate of approximately several dozens of kbps, an inexpensive communication apparatus can be easily manufactured using demodulation ICs and peripheral components for generally available inexpensive FM radio receivers.

However, in a case where communication is required to be performed at a still higher communication rate, it is necessary to structure a complicated circuit using separate components. Further, the cost is more likely to increase due to the increase of circuit adjustment and the like. Accordingly, an inexpensive communication apparatus is limited to have a communication rate of approximately 10 Mbps in actual use.

An optical data transmission apparatus having an optical signal transmission unit and an optical signal reception unit is basically the same as the data transmission apparatus which does not use light but uses electromagnetic waves, in that the optical data transmission apparatus needs to receive signals while preventing lights from interfering with each other.

In order to solve this problem, Japanese Unexamined Patent Publication No. H11-7027 suggests a mobile unit game apparatus in which an A-channel for communication from a control apparatus to a mobile unit employs infrared light linearly polarized in a predetermined direction and a B-channel for communication from the mobile unit to the control apparatus employs infrared light linearly polarized in a direction different from the predetermined direction.

Japanese Unexamined Patent Publication No. H08-335911 suggests a bidirectional optical spatial transmission apparatus, in which a light emitting apparatus and a light receiving apparatus face each to other via a space so as to constitute a pair, and two or more pairs of the light emitting apparatus and the light receiving apparatus are arranged to face each other in the opposite positions, so that the light emitting apparatus and the light receiving apparatus in each pair can transmit/receive light to/from each other.

In the bidirectional optical spatial transmission apparatus, a laser device of the light emitting apparatus in one pair and a laser device of the light emitting apparatus in another pair are arranged and fixed such that both of the laser devices oscillate laser light beams having polarization directions substantially perpendicular to each other.

Likewise, Japanese Unexamined Patent Publication No. 2008-118542 suggests an infrared light optical signal transmission apparatus adapted to transmit a first optical signal constituted by infrared light and a second optical signal constituted by infrared light, the infrared light optical signal transmission apparatus including a first optical signal transmission unit for transmitting the first optical signal polarized in a first polarization direction and a second optical signal transmission unit for transmitting the second optical signal polarized in a second polarization direction crossed with the first polarization direction.

A relatively inexpensive LED employed as a light source of a light emitting unit has an advantage that a polarization plane of an optical signal output from the light source can be easily adjusted according to the direction of installing a polarization element.

However, unlike a laser diode, an LED is not a light source emitting coherent light. Therefore, there is a drawback that even though an optical lens is used to condense light, the LED has a poor directivity and produces a blurry light beam with the power being diverged, thus has a limited communication range. Further, there is a drawback that the LED cannot be used for high-speed communication of more than 10 Mbps due to a switching rate thereof.

On the other hand, in a case where a relatively inexpensive semiconductor laser for emitting single-mode light is employed as a light source of a light emitting unit, the semiconductor laser emits coherent light, which enables sending parallel light beams in a long distance and condensing light beams into an extremely small point by using an optical lens. Therefore, the semiconductor laser can handle high-speed communication. It should be noted that a generally available red laser diode emits single-mode light having a polarization property in either a TE mode having a polarization property parallel with a junction surface or in a TM mode having a polarization property perpendicular to the junction surface.

However, the polarization direction of the polarization element arranged at each of the light emitting side and the light receiving side needs to be aligned with the polarization direction of the light output from the laser diode. Accordingly, it is necessary to adjust the implementation direction, that is, the installation posture, of the laser diode with respect to the polarization element. Therefore, it is necessary to give careful consideration to the design of a printed circuit board and the design of a mechanism of an optical signal transmission unit including the polarization element, and there is a problem that troublesome adjustment is necessary during the assembly process.

In a case where any one of the first communication unit and the second communication unit is installed in a mobile unit, and the first communication unit and the second communication unit move relatively to each other, communication therebetween may be affected by interference, and further, an optical axis may be displaced due to vibration and the like. Therefore, a certain directivity property (area property) is required to ensure reception performance. For example, when any one of the first communication unit and the second communication unit is mounted on a rail-guided vehicle and the directivity angle thereof is small, mechanical axes of bumps and warpage of tracks (rails) are required to be highly accurate. However, it is impossible to satisfy the required accuracy under various kinds of limitations such as the cost, the operability, the secular distortion, and the like.

In particular, since the laser diode has an astigmatic difference, the position of a light emitting point appears to be different in the vertical direction and the horizontal direction of the beam. Even though an optical lens condenses light beams into parallel light, the light beam has a significant elliptic shape, and therefore, there is a problem that it is impossible to ensure a sufficient directivity property.

SUMMARY OF THE INVENTION

In view of the above-described problems, an object of the present invention is to provide an optical data transmission apparatus of which troublesome assembly processes such as positioning can be alleviated, in which stable high-speed optical communication can be performed with a mobile unit from a short distance to a long distance.

In order to achieve the above-described object, an optical data transmission apparatus according to the present invention is provided with a first communication unit and a second communication unit which are arranged to freely move relatively to each other and face each other, the first communication unit including a first optical signal transmission unit having a light emitting unit provided with a laser diode for emitting single-mode light, a multi-mode optical fiber for guiding a single-mode optical signal output from the light emitting unit, converting the single-mode optical signal into a multi-mode optical signal, and outputting the multi-mode optical signal, an optical lens for forming the optical signal output from the multi-mode optical fiber into parallel light, and a first polarization element for passing the optical signal polarized in a first direction out of optical signals output from the optical lens, the first communication unit further including a first optical signal reception unit having a second polarization element for passing an optical signal polarized in a second direction different from the first direction out of incident optical signals, an optical lens for condensing the optical signal passing through the second polarization element, and a light receiving unit for receiving the optical signal output from the optical lens, the second communication unit including a second optical signal transmission unit having a light emitting unit provided with a laser diode for emitting single-mode light, a multi-mode optical fiber for guiding the single-mode optical signal output from the light emitting unit, converting the single-mode optical signal into a multi-mode optical signal, and outputting the multi-mode optical signal, an optical lens for forming the optical signal output from the multi-mode optical fiber into parallel light, and a second polarization element for passing the optical signal polarized in the second direction out of optical signals output from the optical lens, the second communication unit further including a second optical signal reception unit having a first polarization element for passing an optical signal polarized in the first direction out of incident optical signals, an optical lens for condensing the optical signal passing through the first polarization element, and a light receiving unit for receiving the optical signal output from the optical lens.

In the above structure, the optical signal output from the light emitting unit having the laser diode for emitting single-mode light is guided to the multi-mode optical fiber. Accordingly, the single-mode optical signal is changed into the multi-mode optical signal in the optical fiber, and the multi-mode optical signal is emitted to the optical lens. Therefore, it is not necessary to adjust the implementation direction of the laser diode for emitting single-mode light in accordance with the polarization direction of the polarization element. Further, it is not necessary to design a complicated printed circuit board or design a complicated mechanism for the optical signal transmission unit including the polarization element, and it is not necessary to perform troublesome adjustment during the assembly process.

Further, the first polarization element is structured to pass the optical signal polarized in the first direction out of the optical signals output from the optical lens, and the second polarization element is structured to pass the optical signal polarized in the second direction that is different from the first direction out of the incident optical signals. Since the polarization directions of the optical signals are different from each other, interference can be avoided.

Even when the laser diode emits a beam spreading into an elliptic shape, the beam passes through the optical fiber, which causes the light beam of the optical signal output from an output end of the optical fiber is formed into a circular shape similar to the shape of a core of the optical fiber. Thus, the astigmatic difference can be eliminated.

In addition to the above-described structure, an output end section of the multi-mode optical fiber included in each of the first optical signal transmission unit and the second optical signal transmission unit is preferably arranged on an optical axis at a focal position of the optical lens so as to face the optical lens.

Further, other aspects of the present invention are more clearly described in the following embodiments.

BRIEF DESCRIPTION OF THE DRAWINGS

FIG. 7 is an explanatory diagram illustrating an external appearance of a communication unit.

FIG. 8A is a top view illustrating the communication unit.
FIG. 8B is a back view illustrating the communication unit.
FIG. 8C is a side view illustrating the communication unit.
FIG. 8D is a front view illustrating the communication unit.

DESCRIPTION OF THE PREFERRED EMBODIMENTS

Examples will be hereinafter described in which an optical data transmission apparatus according to the present invention is applied to control a stacker crane that is installed in a general logistics warehouse.

Figure 1:
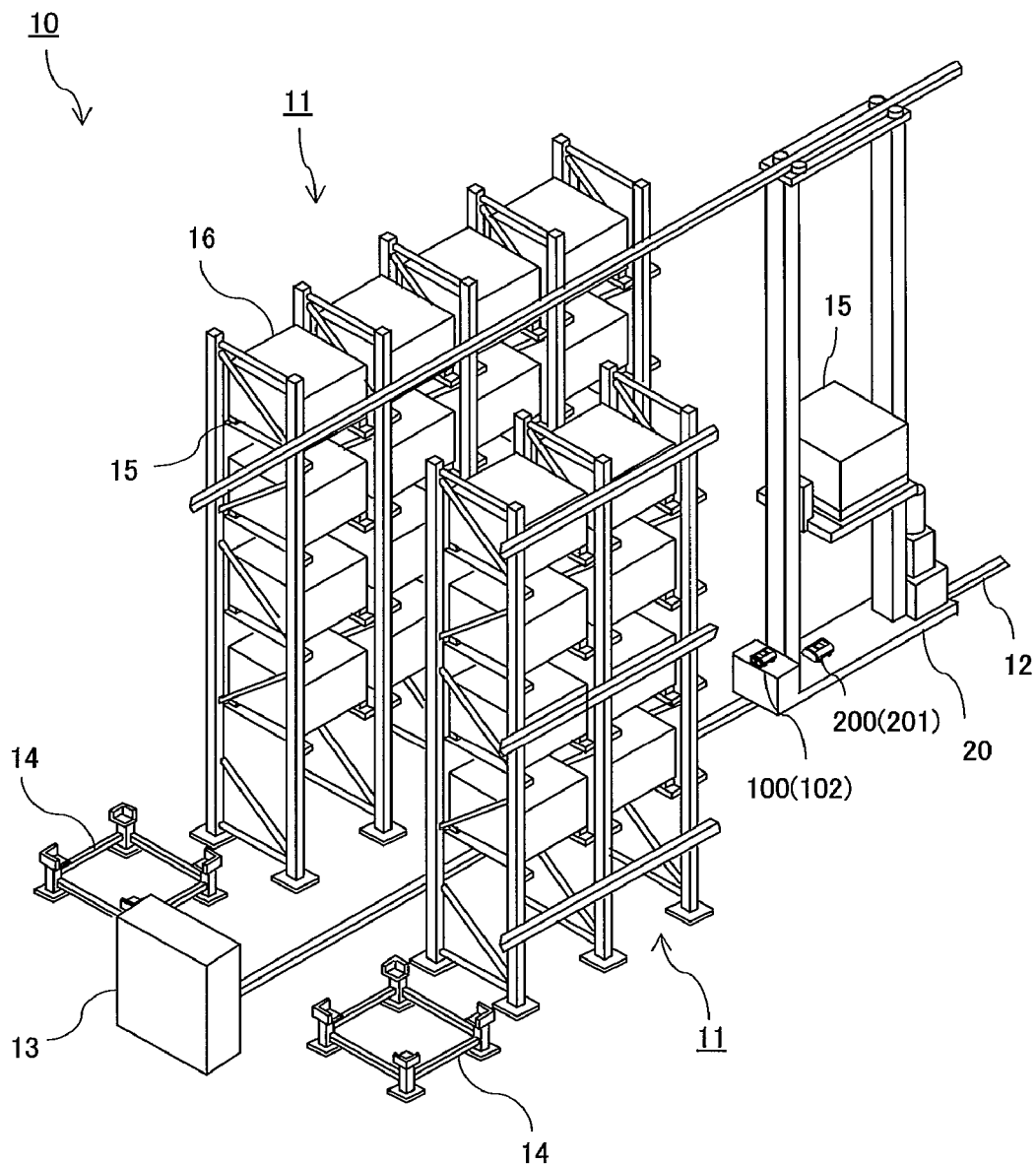
FIG. 1 is an explanatory diagram illustrating a general logistics warehouse in which a control instruction is transmitted by an optical data transmission apparatus according to the present invention.

As shown in FIG. 1, a logistics warehouse 10 includes a pair of stacker shelves 11, a rail 12 laid between the pair of stacker shelves 11, a stacker crane 20 moving along the rail 12, a pair of load stackers 14 installed on both sides of the rail 12, and a system control apparatus 13 which is arranged at one end of the rail 12 and which gives a storage/retrieval instruction to the stacker crane 20.

In each of the stacker shelves 11, many storage units 15 are arranged in the vertical direction and the horizontal direction. An object 16 to be conveyed is placed on each of the storage units 15.

In the following description, one of the running directions of the stacker crane 20 is referred to as a base end side at which the system control apparatus 13 and the like are arranged, and the other thereof is referred to as the other end side. It should be noted that an end section of the rail 12 at base end side is defined as a reference position of the stacker crane 20 for running/moving.

Figure 2:
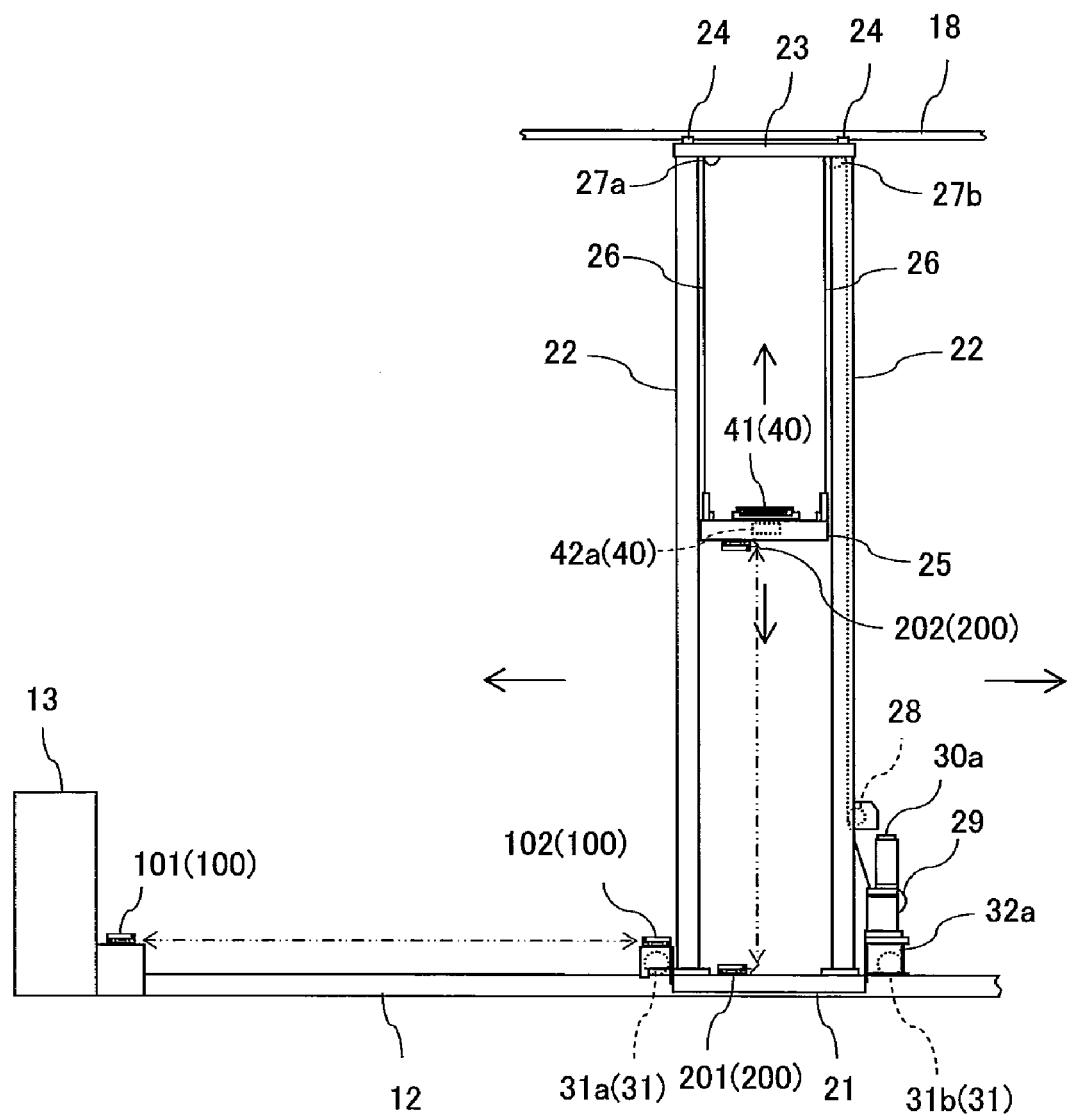
FIG. 2 is an explanatory diagram illustrating a stacker crane including an optical data transmission apparatus.

As shown in FIG. 2, the stacker crane 20 includes a running vehicle 21 running along the rail 12, a pair of lifter masts 22 vertically arranged on this running vehicle 21, and an upper frame 23 for connecting/coupling the pair of lifter masts 22 at the upper end section.

The upper frame 23 is attached with a plurality of guide rollers 24 which rotate horizontally. These guide rollers 24 sandwich a guide rail 18 and rotate on the guide rail 18, so as to prevent the running vehicle 21 from falling down.

Further, a lifter 25 is guided and supported by the pair of lifter masts 22 in such a manner that the lifter 25 can freely move upward and downward. The lifter 25 is provided with a fork device 40 which is capable of carrying and moving goods.

The running vehicle 21 is moved horizontally, the lifter 25 is moved upward/downward, and the fork device 40 is operated, so that an object 16 placed on the load stacker 14 is carried and moved to the storage unit 15, or an object 16 stored in the storage unit 15 is carried and moved to the load stacker 14.

The lifter 25 is hung by a lifter chain 26, and is adapted to move upward and downward. The lifter chain 26 runs via driven sprockets 27a, 27b attached to the upper frame 23 and by way of a guide sprocket 28 arranged on one of the lifter masts 22, and is wound up by a winding drum 29.

The winding drum 29 winds up or winds out the lifter chain 26 by driving and rotating a lifter servo motor 30a, which is controlled by a servo control unit 30b (see FIG. 3), in a forward/backward direction, thus moving the lifter 25 upward and downward.

The fork device 40 includes a fork 41 sliding horizontally in a direction perpendicular to the running direction of the running vehicle 21 and capable of freely placing the object 16, a fork servo motor 42a for sliding the fork 41 to a retracted position at which the fork 41 is retracted onto the lifter 25 and an extended position at which the fork 41 is extended to the storage unit 15, and a servo control unit 42b (see FIG. 3) for controlling the servo motor 42a.

In order to take out the object 16 stored in the storage unit 15, the lifter 25 is first moved to the front of the specified storage unit 15. Subsequently, the fork 41 is caused to slide from the retracted position in the lifter 25 to the extended position to the storage unit 15 on which the object 16 is placed. In this state, the lifter 25 is slightly raised, and the fork 41 is caused to slide to the retracted position again. As a result of this operation, the object 16 is placed on the lifter 25.

In order to store the object 16 in the storage unit 15, the lifter 25 is first moved to the front of the specified storage unit 15. Subsequently, the fork 41 on which the object 16 is placed is caused to slide from the retracted position in the lifter 25 to the extended position to the storage unit 15. In this state, the lifter 25 is slightly lowered, and the fork 41 is caused to slide to the retracted position again. As a result of this operation, the object 16 is stored in the storage unit 15.

The running vehicle 21 includes a plurality of wheels 31 which are capable of freely running on the rail 12. Among these wheels 31, a wheel 31b at another end side is structured as a driving wheel that is driven by the running servo motor 32a controlled by the servo control unit 32b (see FIG. 3), and a wheel 31a at the base end side is structured as a driven wheel that can freely rotate.

Figure 3:
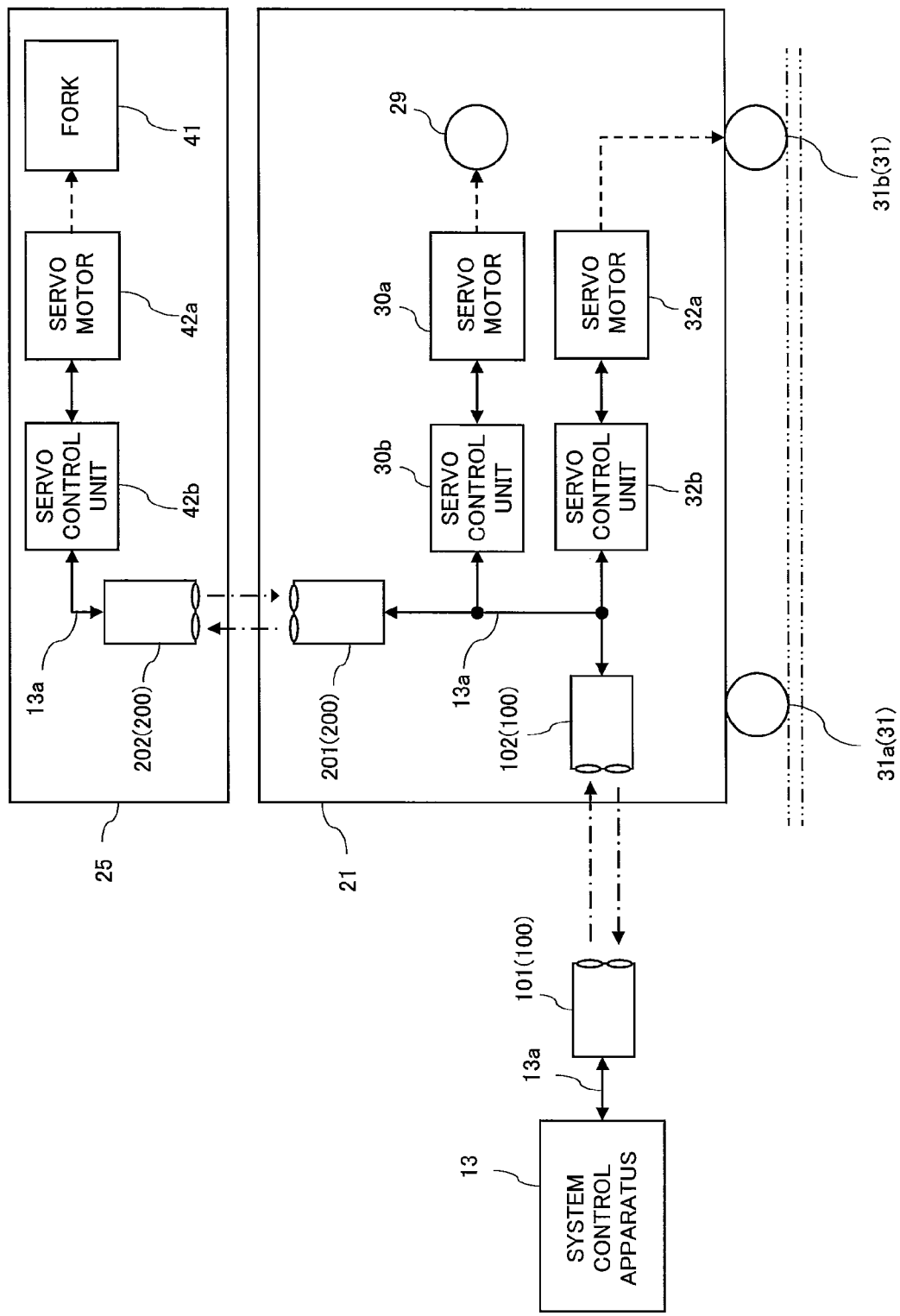
FIG. 3 is an explanatory diagram illustrating communication between a system control apparatus and a servo control unit.

As shown in FIG. 3, a full-duplex communication line 13a connected to the system control apparatus 13 is connected by the multi-drop method to the servo control unit 32b for controlling the running servo motor 32a, the servo control unit 30b for controlling the lifter servo motor 30a, and the servo control unit 42b for controlling the fork servo motor 42a.

More specifically, the servo communication system is structured as follows. The servo control units 32b, 30b, 42b receive control instructions from the system control apparatus 13 via the communication line 13a, and control the running servo motor 32a, the lifter servo motor 30a, and the fork servo motor 42a, respectively. Further, the servo control units 32b, 30b, 42b transmit the control states thereof to the system control apparatus 13 via the communication line 13a.

The servo control unit 32b drives the servo motor 32a based on the control instruction from the system control apparatus 13. Information on the number of rotations and the rotation angle of the servo motor 32a is fed back to the system control apparatus 13 via the servo control unit 32b. Thus, the running position of the running vehicle 21 in the horizontal direction is controlled by the system control apparatus 13.

The servo control unit 30b drives the servo motor 30a based on the control instruction from the system control apparatus 13. Information on the number of rotations and the rotation angle of the servo motor 30a is fed back to the system control apparatus 13 via the servo control unit 30b. Thus, the lifting position of the lifter 25 in the vertical direction is controlled by the system control apparatus 13.

The servo control unit 42b drives the servo motor 42a based on the control instruction from the system control apparatus 13. Information on the number of rotations and the rotation angle of the servo motor 42a is fed back to the system control apparatus 13 via the servo control unit 42b. Thus, the slide position of the fork 41 in the horizontal direction is controlled by the system control apparatus 13.

The communication line 13a is structured by a LAN such as Ethernet (registered trademark) using copper cables, optical fiber cables, and the like. An optical data transmission apparatus 100 according to the present invention is interposed in the communication line 13a between the servo control unit 30b and the servo control unit 32b. An optical data transmission apparatus 200 according to the present invention is interposed in the communication line 13a toward the servo control unit 42b. Data transmitted and received via the communication line 13a are relayed by the two optical data transmission apparatuses 100, 200. In the present embodiment, the LAN using optical cables is employed.

The optical data transmission apparatus 100 is provided between the system control apparatus 13 and the running vehicle 21 moving relatively to the system control apparatus 13. The optical data transmission apparatus 100 includes a first communication unit 101 and a second communication unit 102. The first communication unit 101 is installed at the system control apparatus 13. The second communication unit 102 is installed on the running vehicle 21 so as to oppose the first communication unit 101.

Likewise, the optical data transmission apparatus 200 is provided between the running vehicle 21 and the lifter 25 moving relatively to the running vehicle 21. The optical data transmission apparatus 200 includes a first communication unit 201 and a second communication unit 202. The first communication unit 201 is installed on the running vehicle 21. The second communication unit 202 is installed on the lifter 25 so as to oppose the first communication unit 201.

In the optical data transmission apparatus 100 (200), the first communication unit 101 (201) and the second communication unit 102 (202) are arranged so as to freely move relatively to each other. Each of the first communication unit 101 (201) and the second communication unit 102 (202) includes an optical signal transmission unit and an optical signal reception unit so as to perform full-duplex communication. In the following description, the optical data transmission apparatus 100 will be explained, but the optical data transmission apparatus 200 is structured in the same manner.

Figure 4:
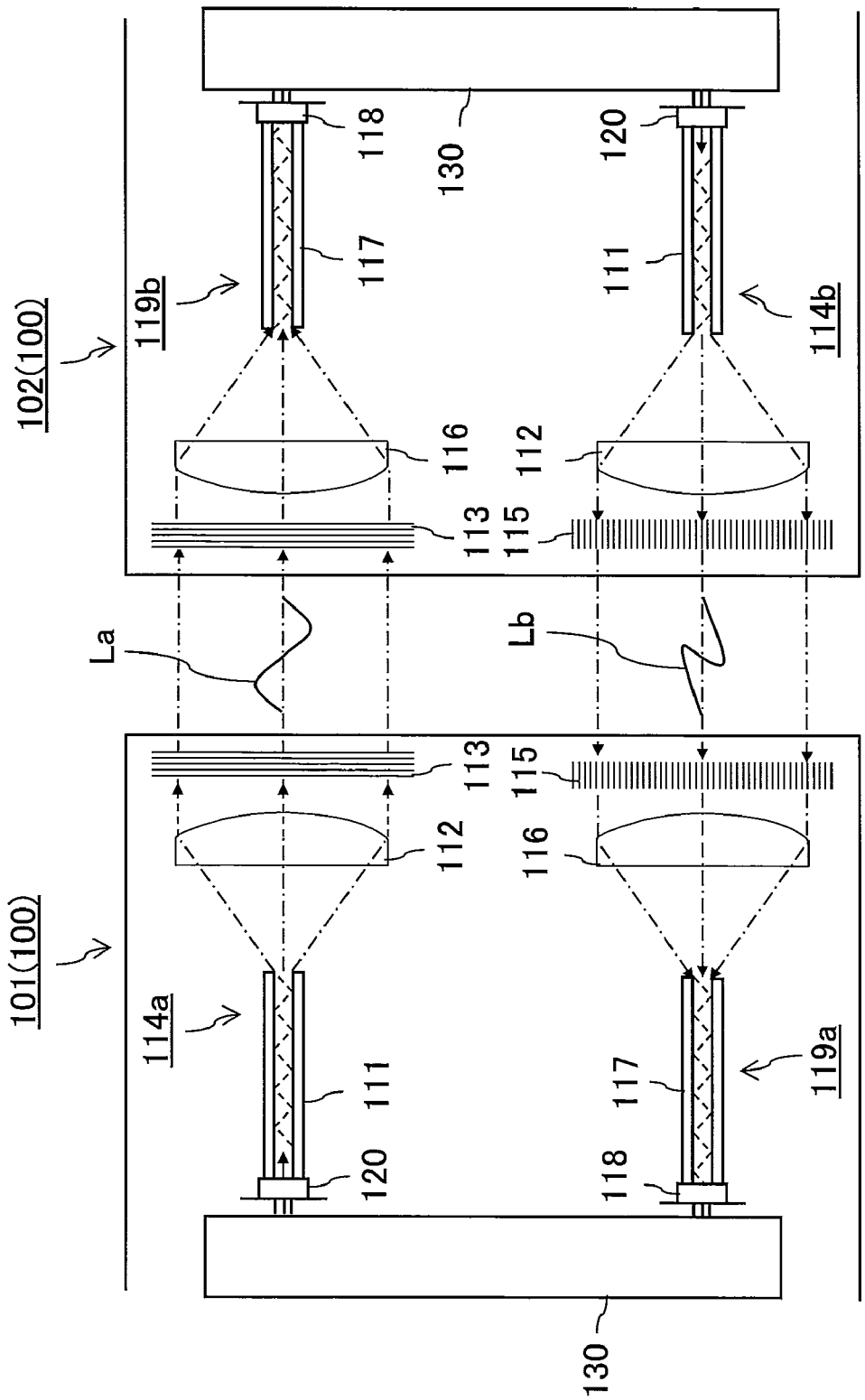
FIG. 4 is an explanatory diagram illustrating optical data transmission between a first communication unit and a second communication unit.

As shown in FIG. 4, the optical data transmission apparatus 100 includes the first communication unit 101 and the second communication unit 102. The first communication unit 101 has a first optical signal transmission unit 114a and a first optical signal reception unit 119a. The second communication unit 102 has a second optical signal transmission unit 114b and a second optical signal reception unit 119b.

The first optical signal transmission unit 114a is a block for converting a signal received via the communication line 13a into an optical signal, which is transmitted in the space, and outputting the optical signal to the second optical signal reception unit 119b. The first optical signal transmission unit 114a includes a light emitting unit having a red laser diode 120 for emitting single-mode light, a multi-mode optical fiber 111 for guiding the optical signal output from the light emitting unit, an optical lens 112 for forming the optical signal output from the multi-mode optical fiber 111 into parallel light, and a first polarization element 113 for passing the optical signal polarized in a first direction La, such as the vertical direction, out of the optical signals output from the optical lens 112.

The first optical signal reception unit 119a is a block for receiving the optical signal output from the second optical signal transmission unit 114b, converting the form of the signal, and outputting the converted signal to the communication line 13a on the upstream side. The first optical signal reception unit 119a includes a second polarization element 115 for passing the optical signal polarized in a second direction Lb crossed with the first direction, such as the horizontal direction, out of the incident optical signals, an optical lens 116 for condensing the optical signal passing through the second polarization element 115, a multi-mode optical fiber 117 for guiding the optical signal output from the optical lens 116, and an avalanche photodiode 118 serving as a receiving unit for receiving the optical signal output from the multi-mode optical fiber 117.

The second optical signal transmission unit 114b is a block for converting the signal received from each of the communication line 13a on the downstream side and the servo control units 30b, 32b into an optical signal, which is transmitted in the space, and outputting the optical signal to the first optical signal reception unit 119a. The second optical signal transmission unit 114b includes a light emitting unit having a red laser diode 120 for emitting single-mode light, a multi-mode optical fiber 111 for guiding the optical signal output from the light emitting unit, an optical lens 112 for forming the optical signal output from the multi-mode optical fiber 111 into parallel light, and a second polarization element 115 for passing an optical signal polarized in the second direction crossed with the first direction, such as the horizontal direction, out of the optical signals output from the optical lens 112.

The second optical signal reception unit 119b is a block for receiving the optical signal output from the first optical signal transmission unit 114a, converting the form of the signal, and outputting the converted signal to the communication line 13a on the downstream side and the servo control units 30b, 32a. The second optical signal reception unit 119b includes a first polarization element 113 for passing an optical signal polarized in the first direction out of the incident optical signals, an optical lens 116 for condensing the optical signal passing through the first polarization element 113, a multi-mode optical fiber 117 for guiding the optical signal output from the optical lens 116, and the avalanche photodiode 118 serving as a receiving unit for receiving the optical signal output from the multi-mode optical fiber 117.

It should be noted that each of the optical lenses 112, 116 is a collimated lens for condensing pencil of rays emitted from a point source of light into a pencil of rays in parallel and condensing the pencil of rays in parallel into one point. Reference numeral 130 denotes an interface circuit between the communication line 13a and the light emitting unit or the reception unit.

Accordingly, in the first communication unit 101, the polarization direction of the optical signal output from the first optical signal transmission unit 114a is different from the polarization direction of the optical signal incident to the first optical signal reception unit 119a. Therefore, a noise signal caused by reflection of the optical signal or the like output from the first optical signal transmission unit 114a is not erroneously received by the first optical signal reception unit 119a.

Further, in the second communication unit 102, the polarization direction of the optical signal output from the second optical signal transmission unit 114b is different from the polarization direction of the optical signal incident to the second optical signal reception unit 119b. Therefore, a noise signal caused by reflection of the optical signal or the like output from the second optical signal transmission unit 114b is not erroneously received by the second optical signal reception unit 119b.

The first polarization element 113 and the second polarization element 115 can be structured by polarizers for passing only light polarized in one direction out of randomly polarized light. The first polarization element 113 and the second polarization element 115 can be arranged such that the polarization directions thereof are crossed each other and preferably the polarization directions are perpendicular to each other.

Alternatively, the first polarization element 113 and the second polarization element 115 can be structured by elements for each passing only clockwise-circularly polarized light or counterclockwise-circularly polarized light out of randomly polarized light. The first polarization element 113 and the second polarization element 115 can be arranged such that the polarization direction of the light emitting side is different from the polarization direction of the light receiving side.

A generally available red laser diode emits single-mode light having a polarization property in either the TE mode having a polarization property parallel with a junction surface (within a light waveguide) or the TM mode having a polarization property perpendicular to the junction surface.

The beam emitted by the laser diode is characterized by having a narrow output angle in a direction parallel to the junction surface thereof, while having a broad output angle in a direction perpendicular to the junction surface. Therefore, even when the beam is condensed by the optical lens into parallel light, an astigmatic difference is generated so that the position of a light emitting point appears to be different in the vertical direction and the horizontal direction of the beam, and the light beam has a significant elliptic shape.

Figure 5:
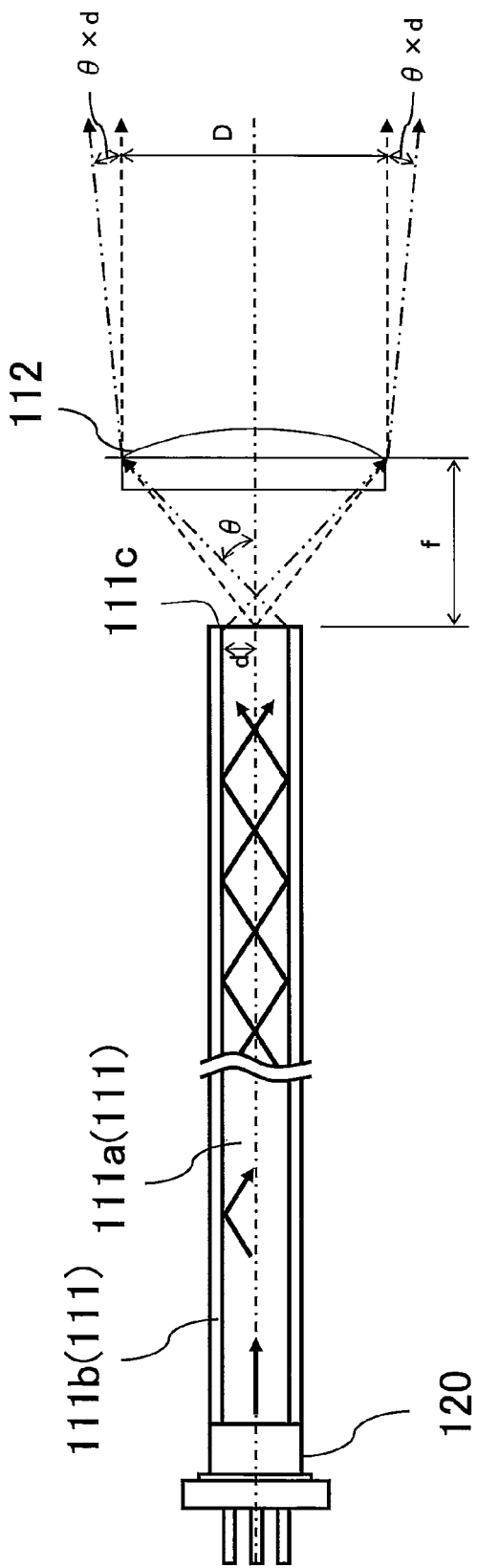
FIG. 5 is an explanatory diagram illustrating a first optical signal transmission unit.

However, as shown in FIG. 5, while the single-mode optical signal output from the red laser diode 120 is transmitted through a core 111a of the multi-mode optical fiber 111, the single-mode optical signal is repeatedly reflected by the boundary between the core 111a and a clad 111b. In this process, the single-mode optical signal has the polarization property disturbed by the affect of variation of the refractive indexes and the distribution property of the core 111a and the clad 111b. Thus, the single-mode optical signal is made into a multi-mode optical signal. This kind of optical fiber is a plastic optical fiber, which can be obtained at an inexpensive price.

As a result, it is not necessary to adjust the implementation direction (installation posture and the like) of the laser diode 120 for emitting single-mode light so as to be aligned with the polarization directions of the polarization elements 113, 115. Further, it is not necessary to design a complicated printed circuit board or design a complicated mechanism for the optical signal transmission unit including the polarization element, and it is not necessary to perform troublesome adjustment during the assembly process.

Further, even when the red laser diode 120 emits a beam spreading into an elliptic shape, the beam passes through the multi-mode optical fiber 111, which causes the light beam of the optical signal output from the output end of the multi-mode optical fiber 111 is formed into the circular shape similar to the shape of the core 111a of the multi-mode optical fiber 111. Thus, the astigmatic difference can be eliminated, and the cross section of the light beam of the pencil of rays having passed through the optical lens 112 is formed into substantially a circular shape.

An output end section 111c of the multi-mode optical fiber 111 is arranged on an optical axis at a focal position of the optical lens 112 so as to oppose the optical lens 112.

The pencil of rays output from the output end section 111c is diverged and radiated at a numerical aperture NA (=refractive index n×sin θ) unique to the fiber, and the pencil of rays reaches the optical lens 112. In the air, the refractive index n is equal to 1, and θ denotes an output angle of the pencil of rays output from the output end section 111c.

The pencil of rays output from a central section of the core 111a of the output end section 111c is output as parallel light from the optical lens 112. When the pencil of rays output from a peripheral section of the core 111a passes through the optical lens 112, the pencil of rays increases a diameter thereof as it moves away from the optical lens 112 due to the aberration of the optical lens 112. As a whole, a light beam is obtained which has a circular cross section with a diameter increasing as it moves away from the optical lens.

Since the core 111a has a circular shape having a diameter d, there is obtained a circular light beam spreading at a directivity angle (θ×d). For example, in a case where the core 111a has a diameter 2 d=φ0.98, a numerical aperture NA=0.5, and a focal length f=40 mm, the output angle θ of the optical signal output from the output end section 111c is θ=$\sin^{-1}$(NA/n)=15 degrees, and the diameter D of the light beam of the optical signal having reached the optical lens 112 is D=2 sin θ×f=20.8 mm. Further, the directivity angle (θ×d) is θ×d=0.686 degrees, and the light beam is diverged from a diameter D=20.8 mm into the peripheral section at the angle of θ×d=0.686 degrees by the optical lens 112.

The first optical signal transmission unit 114a outputs the pencil of rays formed by the optical lens 112 into parallel light that does not spread at the directivity angle (θ×d) or the pencil of rays having an elliptic cross sectional shape that is made by condensing the beam emitted from the red laser diode 120 and spreading in the elliptic shape into parallel light by the optical lens 112. When the first optical signal transmission unit 114a outputs the pencil of rays, and the optical axis is displaced due to vibration or the like caused by movement of the running vehicle 21, it is highly possible that the second optical signal reception unit 119b fails to correctly receive the light, depending on the degree of displacement or the direction of displacement of the optical axis.

However, the pencil of rays spreading at the directivity angle (θ×d) by the optical lens 112 and having a circular cross section can ensure a wide allowable range so that the second optical signal reception unit 119b can correctly receive the light even though the optical axis is displaced to some extent.

The directivity angle (θ×d) is a value appropriately set based on the core diameter φ of the multi-mode optical fiber 111, the numerical aperture NA, the focal length f of the optical lens 112, and the like.

It should be noted that the red laser diode 120 and one end of the multi-mode optical fiber 111 are arranged to be in close contact with each other without any gap. Accordingly, the light emitted from the red laser diode 120 can be efficiently output to the multi-mode optical fiber 111.

Referring back to FIG. 4, the input end section of the multi-mode optical fiber 117 of each of the first optical signal reception unit 119a and the second optical signal reception unit 119b is also arranged on the optical axis at the focal position of the corresponding optical lens 116 so as to face the optical lens 116 in order to reduce the loss of the amount of light.

The light receiving unit can be arranged to directly receive the pencil of rays condensed by the optical lens 116. However, when the pencil of rays is received via the multi-mode optical fiber 117, the arrangement of the respective elements can be designed with a higher degree of flexibility.

Figure 6:
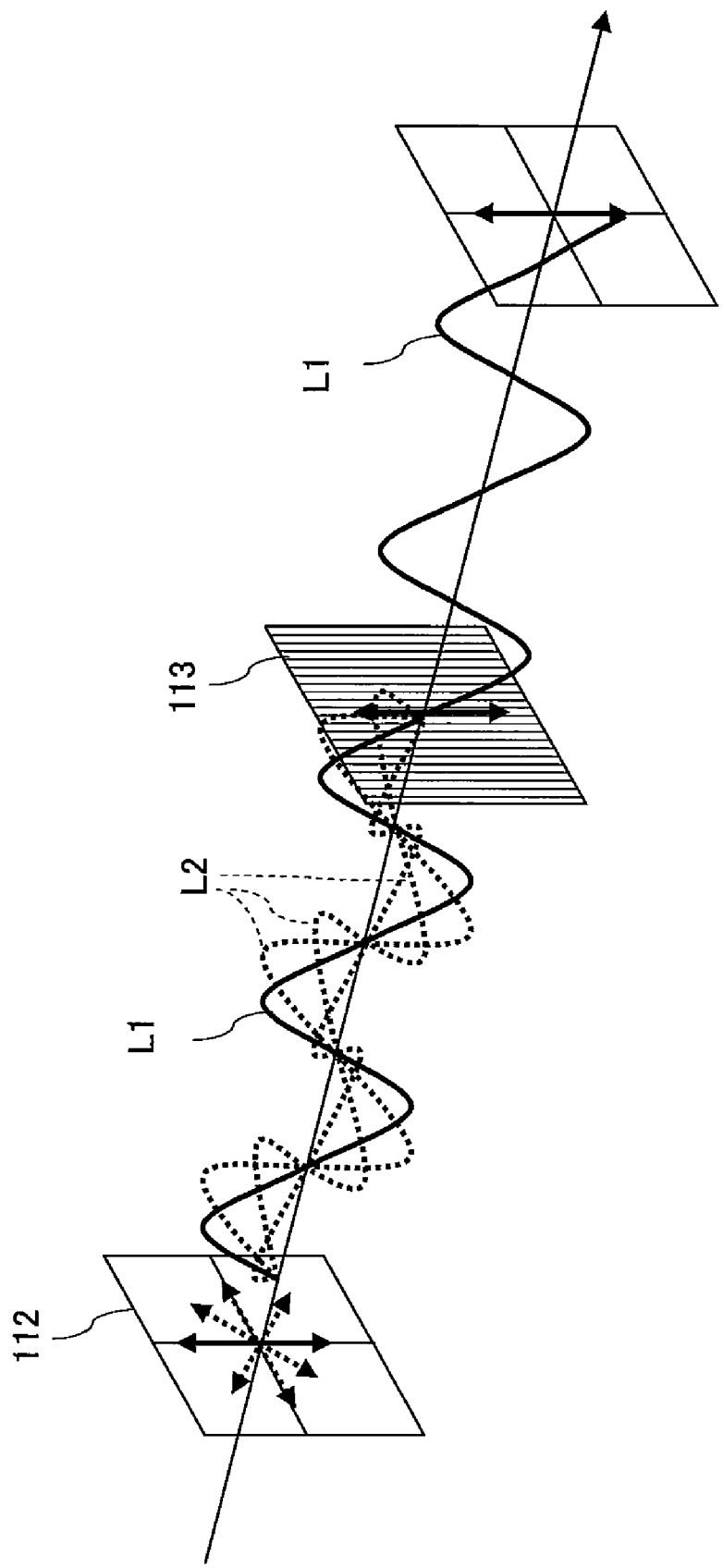
FIG. 6 is an explanatory diagram illustrating polarization of an optical signal with use of a polarization element.

As shown in FIG. 6, when the polarization element 113 is structured to pass only the linearly, vertically polarized component out of the optical signal components and block the remaining components, the polarization element 113 blocks an optical signal L2 having the directional components other than a vertical direction component L1 in the optical signal that has passed through the multi-mode optical fiber 111 and has been condensed by the optical lens 112 into the parallel pencil of rays, and the polarization element 113 passes the linearly polarized light having only the vertical direction component L1. In other words, it is not necessary to adjust the implementation direction of the laser diode 120 for emitting single-mode light.

As shown in FIG. 7, each of the first communication unit 101 and the second communication unit 102 arranged on the running vehicle 21 and facing the first communication unit 101 includes a casing 301 having an upper casing 301a and a lower casing 301b, and an end section cover member 302 arranged on a side surface of the casing 301. The end section cover member 302 is formed with a light emission window 303 for emitting an optical signal and a light reception window 304 for receiving an optical signal. Only the first communication unit 101 will be described hereinafter, but the second communication unit 102 has the same structure.

As shown in FIGS. 8A, 8B, 8C and 8D, a communication connector 305 and a power source connector 306 are arranged on a side surface opposite to the surface arranged with the end section cover member 302. The communication connector 305 (in the present embodiment, an optical coupler for connecting the optical fiber 13a) connects the communication line 13a. The power source connector 306 connects a power line. A display window 307 is arranged on the upper surface to display the operational state of the communication unit.

Figure 9A:
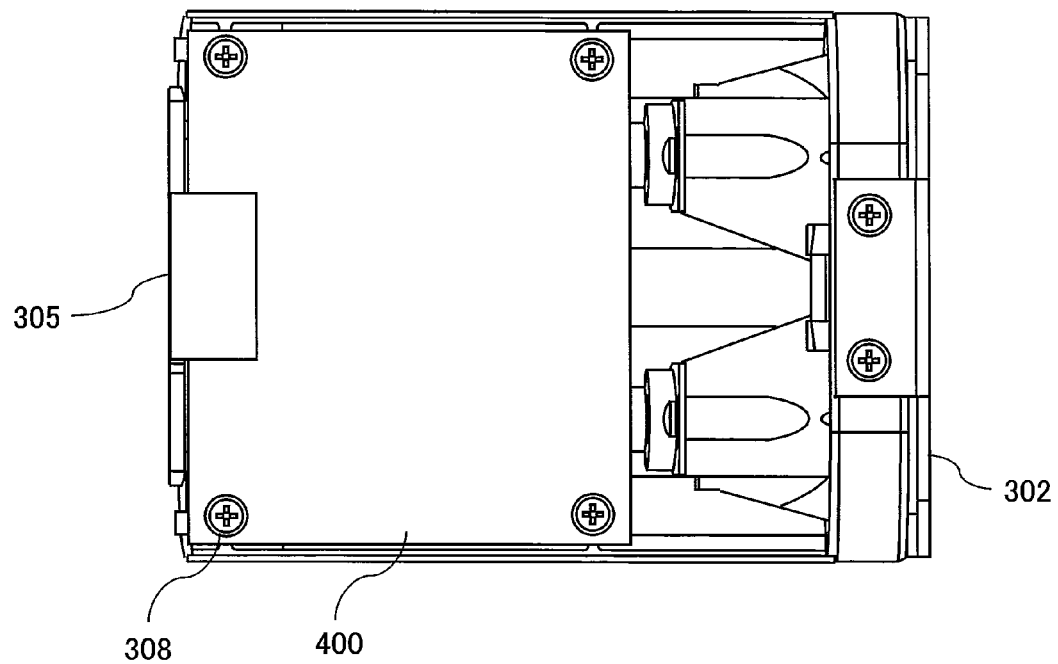
FIG. 9A is a top view illustrating the inside of the communication unit.
Figure 9B:
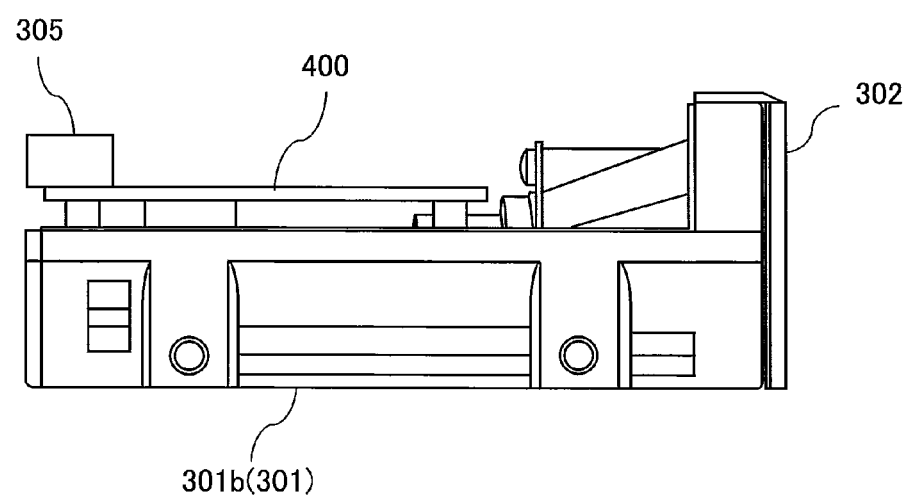
FIG. 9B is a side view illustrating the inside of the communication unit.

The upper casing 301a is detachable with the lower casing 301b. As shown in FIGS. 9A and 9B, a circuit board 400 mounted with an interface circuit 130 is detachably attached to the lower casing 301b with a plurality of screws 308.

Figure 10:
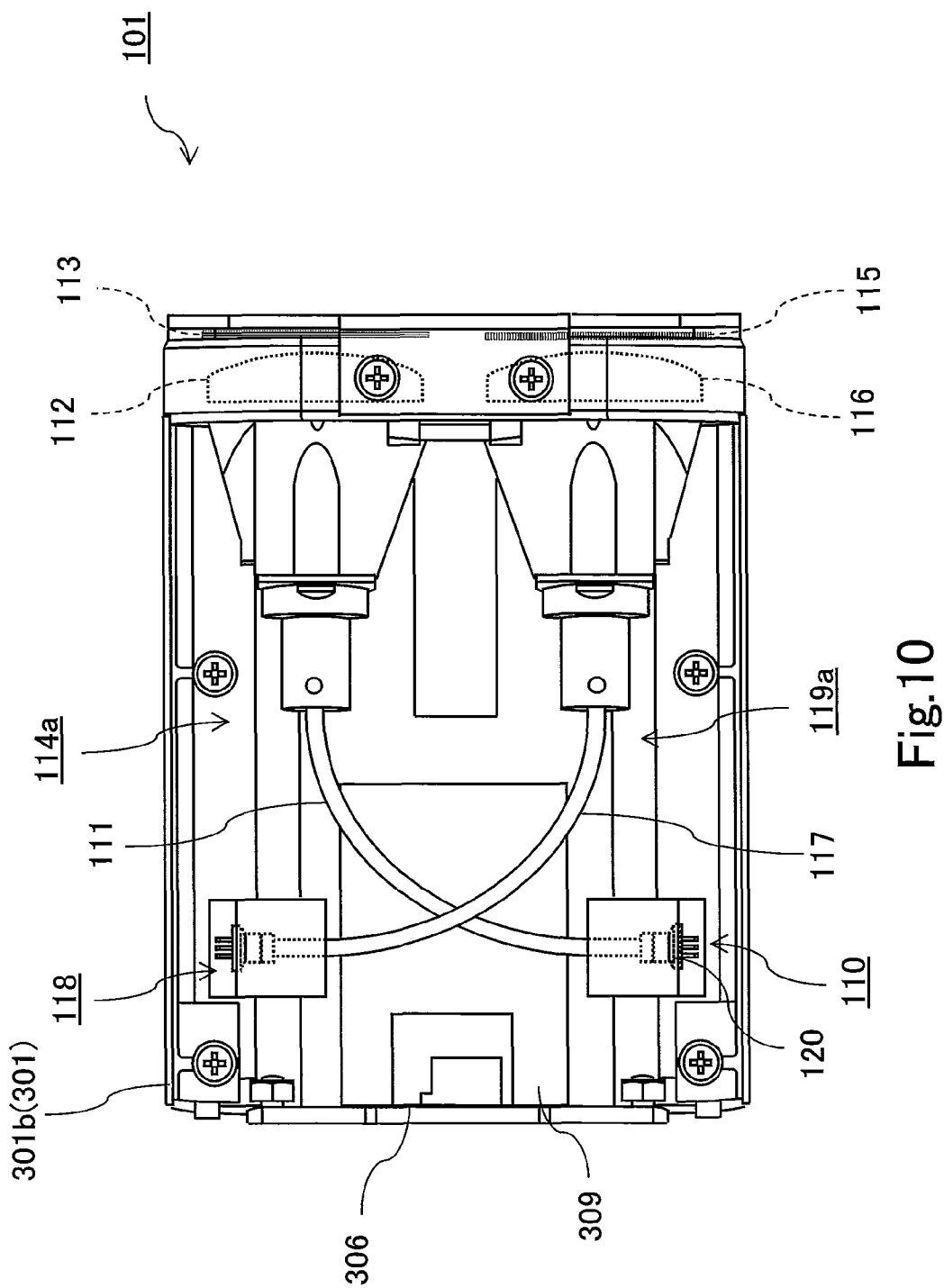
FIG. 10 is a top view illustrating the structure of the communication unit.

As shown in FIG. 10, the lower casing 301b includes the first optical signal transmission unit 114a, the first optical signal reception unit 119a, and a power source board 309 arranged with the power source connector 306. The first optical signal transmission unit 114a includes the light emitting unit (red laser diode) 110, the multi-mode optical fiber 111, the optical lens 112, and the first polarization element 113. The first optical signal reception unit 119a includes the second polarization element 115, the optical lens 116, the multi-mode optical fiber 117, and the light receiving unit (avalanche photodiode) 118.

The flexible multi-mode optical fibers 111, 117 are interposed between the light emitting unit 110 and the optical lens 112 and between the optical lens 116 and the light receiving unit 118, respectively. Therefore, the power source board 309, the circuit board 400, and the respective members can be arranged within the casing 301 with a high degree of flexibility, thus achieving a simple structure and reduction of the size.

The above-described interface circuit 130 is also common. Accordingly, the interface circuit 130 of the first communication unit 101 will be hereinafter described.

Figure 11:
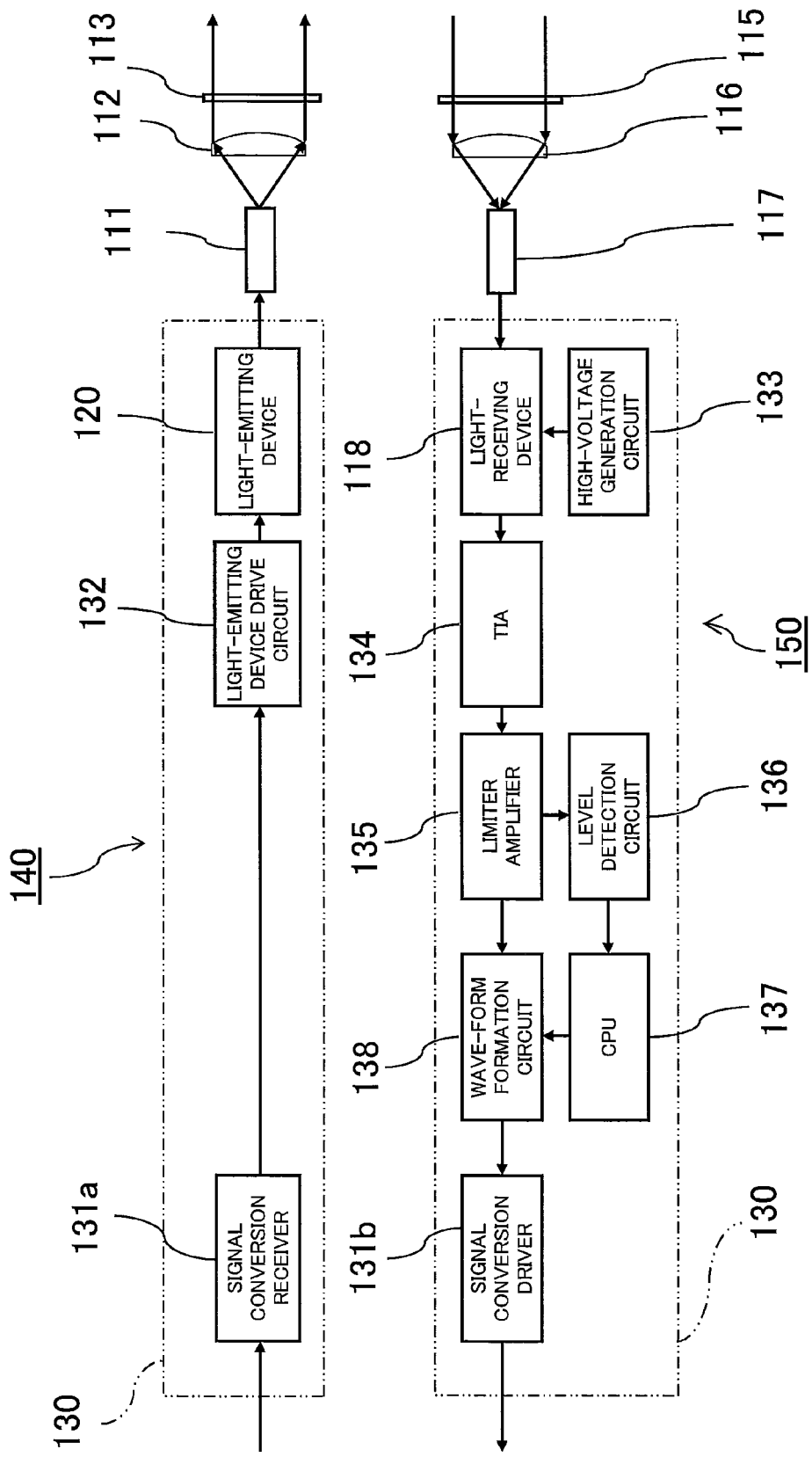
FIG. 11 is an explanatory diagram illustrating a principal circuit block of the communication unit.

As shown in FIG. 11, the interface circuit 130 includes a circuit block 140 and a circuit block 150. The circuit block 140 converts a signal received via the communication line 13a into an optical signal, which is transmitted in the space, and outputs the converted signal to the second optical signal reception unit 119b. The circuit block 150 receives the optical signal output from the second optical signal transmission unit 114b, converts the form of the signal, and outputs the converted signal to the communication line 13a on the upstream side.

The circuit block 140 includes a signal conversion receiver 131a for converting an optical signal input via the communication line 13a, that is, an optical pulse row, into an electric pulse signal. Further, the circuit block 140 includes a light-emitting device drive circuit 132 for driving the red laser diode 120, that is, the light-emitting device, based on the electric pulse signal output from the signal conversion receiver 131a.

The circuit block 150 includes a high-voltage generation circuit 133 for applying a power source voltage to the avalanche photodiode 118 serving as a light-receiving device, a transimpedance amplifier (TIA) 134 for converting an electric current signal of the avalanche photodiode 118, which has received the optical signal in a pulse form, into a voltage signal, and a limiter amplifier 135 for amplifying the output from the transimpedance amplifier 134.

A wave-form formation circuit 138 forms the wave form of the pulse signal amplified by the limiter amplifier 135 into a pulse signal having the original frequency and duty ratio. The pulse signal is input to the signal conversion driver 131b to be converted into an optical pulse signal. Then, the optical pulse signal is output to the communication line 13a.

Further, the pulse signal amplified by the limiter amplifier 135 is input to a level detection circuit 136. The level detection circuit 136 detects the signal level of the pulse signal, and the detected signal level is input to a CPU 137.

The CPU 137 controls to allow a user to monitor display LEDs arranged in the display window 307 and a second display window 307a (see FIG. 8) which is visible through the end section cover member 302. The display window 307 is arranged with two visible LEDs. The second display window 307a is arranged with one visible LED.

One of the LED arranged in the display window 307 indicates the state of the power source. When the power source is turned on, the LED is lit, while the power source is shut down, the LED is turned off. The other LED as well as the LED in the second display window 307a are lit according to the signal level. When the signal level is determined to be less than a first threshold value, both of the LEDs are turned off. When the signal level is determined to be equal to or more than the first threshold value and is determined to be less than a second threshold value that is higher than the first threshold value, the LED in the second display window 307a is lit. When the signal level is determined to be equal to or more than the second threshold value, both of the LEDs are lit.

More specifically, a signal transmission circuit for outputting an electric signal obtained by photoelectric conversion performed at the light receiving unit to the subsequent stage is structured by the transimpedance amplifier (TIA) 134, the limiter amplifier 135, the wave-form formation circuit 138, and the signal conversion driver 131b. A receiving level detection circuit for detecting the strength of the optical signal is structured by the level detection circuit 136 and the CPU 137.

The receiving level detection circuit is structured to light the light-emitting device for light-emission strength monitoring when the strength of the optical signal is determined to be higher than a predetermined reference level. The light-emitting device is arranged at a position visible from the front surface side of the casing of the apparatus so that the light-emitting device serves as a monitor for positioning the first communication unit or the second communication unit. In other words, the light-emitting device is arranged in the second display window 307a.

For example, a previously prepared positioning jig or the like is used to attach the first communication unit 101 to the system control apparatus so that a signal is output from the communication line 13a. Subsequently, the second communication unit 102 is attached to the running vehicle 21 so that an optical signal is output from the second communication unit 102 to the first communication unit 101. The user visually checks the second display window 307a of the first communication unit 101, and positions and fixes the second communication unit 102 in such a posture that the LED of the second display window 307a is lit. Thus, the optical axis can be easily adjusted.

When the optical data transmission apparatus is attached and the stacker crane is actually operated, the CPU 137 controls as follows. In a case where the CPU 137 determines that the output of the level detection circuit 136 is less than the first threshold value, the CPU 137 stops the operation of the waveform formation circuit 138 so as to stop transmission of the electric signal to the subsequent stage.

When the strength of the optical signal is determined to be less than the first threshold value, the reliability of the optical signal received by the reception unit may be reduced and incorrect reception may occur. In such a case, the signal transmission circuit stops the transmission of the electric signal to the subsequent stage, thus preventing occurrence of incorrect operation caused by reception of an incorrect optical signal. It should be noted that the first threshold value is not especially limited to a specific value. The first threshold value may be set as a predetermined reference level that is appropriately determined through experiment and the like.

Figure 12:
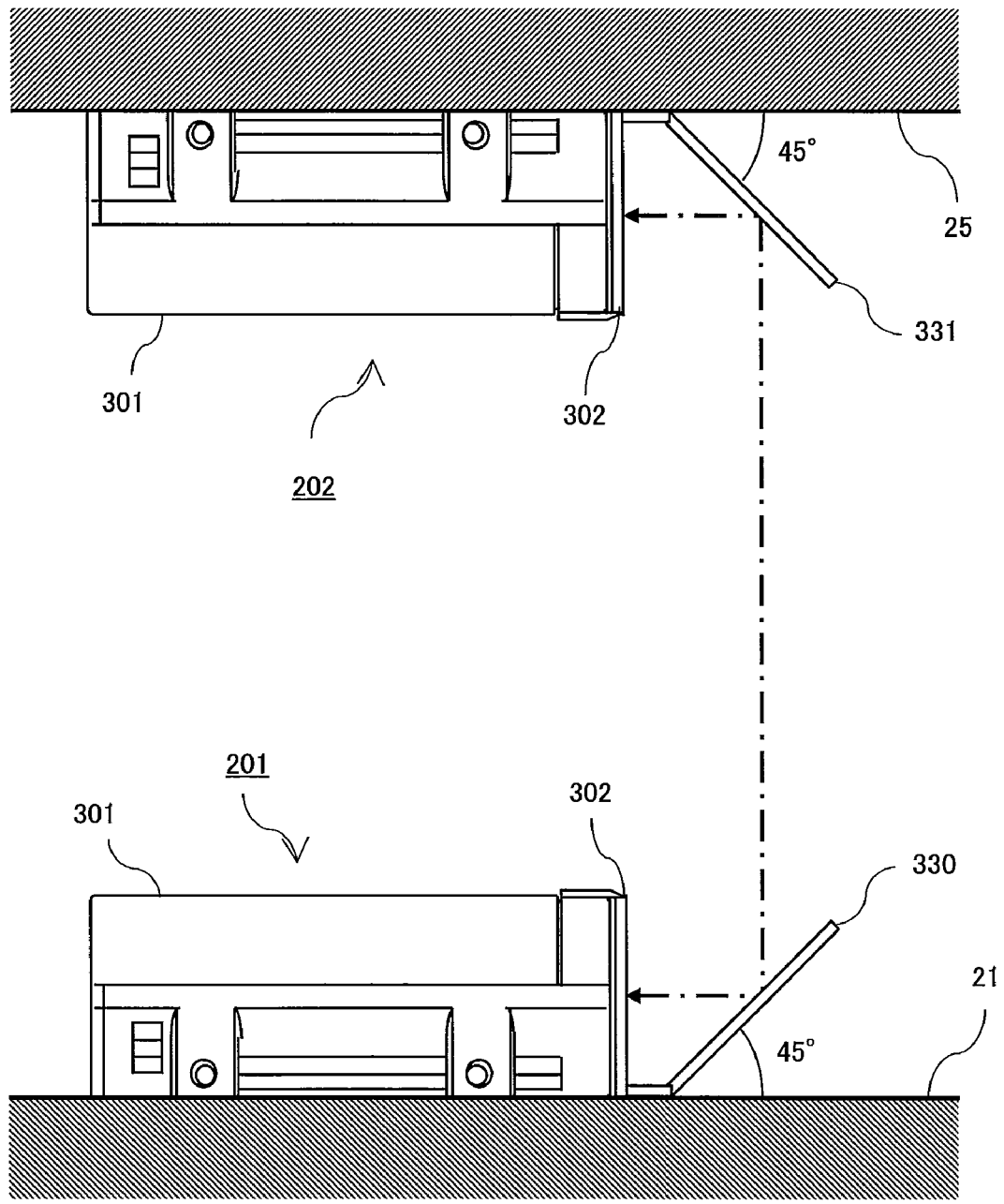
FIG. 12 is an explanatory diagram illustrating a first communication unit and a second communication unit according to another embodiment.

As shown in FIG. 12, reflective members 330, 331 may be arranged in front of the light emission window 303 and the light reception window 304 on the respective end section cover members 302. The reflective members 330, 331 each reflect the optical axis along which the corresponding optical signal is propagated at 45 degrees above the casing 301. In this arrangement, the profile in the height direction is no more than the thickness of the casing 301, and it is not necessary to occupy a large installation space.

In particular, it is preferable to apply the above structure to the first communication unit 201 installed on the running vehicle 21 and to the second communication unit 202 installed on the lifter 25 so as to face the first communication unit 201.

Another embodiment of the optical data transmission apparatus will be hereinafter described. The above-described embodiment is an example in which the red laser diode 120 is used. The wave length of the light source structuring the light emission unit is not limited to the red color as long as the light source is a laser diode for emitting single-mode light. For example, the light source may be a laser diode for emitting light having a wave length in an infrared region.

The above embodiment describes the optical data transmission apparatus provided in the servo communication system including a plurality of servo control units for controlling the servo motors, connected by the multi-drop method to the full-duplex communication line connected to the system control apparatus, in which the servo control unit controls the servo motor upon receiving the control instruction from the system control apparatus via the communication line, and transmits the control state thereof to the system control apparatus via the communication line, and the first communication unit and the second communication unit are interposed between the communication line and the servo control unit.

However, the communication system to which the optical data transmission apparatus according to the present invention is applied is not limited to the above servo communication system. The present invention can be applied to any system as long as it is necessary to communicate between mobile units moving relatively to each other in the full-duplex method. For example, the present invention can be applied to a semiconductor wafer conveying system used in semiconductor manufacturing equipment.

Any of the above-described embodiments is merely an example of the present invention. It is to be understood that the present invention is not limited to the above description, and the specific structure of each unit may be appropriately changed in design as long as the operations and the effects of the present invention are achieved.

What is claimed is:

1. An optical data transmission apparatus comprising a first communication unit and a second communication unit arranged to face each other in such a manner to be movable relatively to each other, the first communication unit including:
a first optical signal transmission unit including a light emitting unit having a laser diode for emitting single-mode light, a multi-mode optical fiber for guiding a single-mode optical signal output from the light emitting unit, converting the single-mode optical signal into a multi-mode optical signal, and outputting the multi-mode optical signal, an optical lens for forming the optical signal output from the multi-mode optical fiber into parallel light, and a first polarization element for passing the optical signal polarized in a first direction out of optical signals output from the optical lens; and
a first optical signal reception unit including a second polarization element for passing an optical signal polarized in a second direction that is different from the first direction out of incident optical signals, an optical lens for condensing the optical signal passing through the second polarization element, and a light receiving unit for receiving the optical signal output from the optical lens, and the second communication unit including:
a second optical signal transmission unit including a light emitting unit having a laser diode for emitting single-mode light, a multi-mode optical fiber for guiding a single-mode optical signal output from the light emitting unit, converting the single-mode optical signal into a multi-mode optical signal, and outputting the multi-mode optical signal, an optical lens for forming the optical signal output from the multi-mode optical fiber into parallel light, and a second polarization element for passing the optical signal polarized in the second direction out of optical signals output form the optical lens; and
a second optical signal reception unit including a first polarization element for passing an optical signal polarized in the first direction out of incident optical signals, an optical lens for condensing the optical signal passing through the first polarization element, and a light receiving unit for receiving the optical signal output from the optical lens.

2. The optical data transmission apparatus according to claim 1, wherein in each of the first optical signal transmission unit and the second optical signal transmission unit, an output end section of the multi-mode optical fiber is arranged on an optical axis at a focal position of the corresponding optical lens so as to face the optical lens.

3. The optical data transmission apparatus according to claim 1, wherein in each of the first optical signal reception unit and the second optical signal reception unit, an input end section of the multi-mode optical fiber is arranged on an optical axis at a focal position of the corresponding optical lens so as to face the optical lens.

4. The optical data transmission apparatus according to claim 1, wherein, to a servo communication system including a plurality of servo control units for controlling servo motors, connected by a multi-drop method to a full-duplex communication line connected to a system control apparatus, in which each of the servo control units controls the corresponding servo motor upon receiving a control instruction from the system control apparatus via the communication line, and transmits a control state thereof to the system control apparatus via the communication line, the first communication unit and the second communication unit are interposed between the communication line and the servo control unit so as to optically transmit data transmitted via the communication line.

5. An optical data transmission apparatus comprising a first communication unit and a second communication unit arranged to face each other in such a manner to be movable relatively to each other,
the first communication unit including:
a first optical signal transmission unit including a light emitting unit having a laser diode for emitting single-mode light, a multi-mode optical fiber for guiding a single-mode optical signal output from the light emitting unit, converting the single-mode optical signal into a multi-mode optical signal, and outputting the multi-mode optical signal, an optical lens for forming the optical signal output from the multi-mode optical fiber into parallel light, and a first polarization element for passing the optical signal polarized in a first direction out of optical signals output from the optical lens; and
a first optical signal reception unit including a second polarization element for passing an optical signal polarized in a second direction that is different from the first direction out of incident optical signals, an optical lens for condensing the optical signal passing through the second polarization element, and a light receiving unit for receiving the optical signal output from the optical lens, and
the second communication unit including:
a second optical signal transmission unit including a light emitting unit having a laser diode for emitting single-mode light, a multi-mode optical fiber for guiding a single-mode optical signal output from the light emitting unit, converting the single-mode optical signal into a multi-mode optical signal, and outputting the multi-mode optical signal, an optical lens for forming the optical signal output from the multi-mode optical fiber into parallel light, and a second polarization element for passing the optical signal polarized in the second direction out of optical signals output from the optical lens; and
a second optical signal reception unit including a first polarization element for passing an optical signal polarized in the first direction out of incident optical signals, an optical lens for condensing the optical signal passing through the first polarization element, and a light receiving unit for receiving the optical signal output from the optical lens, wherein
the first optical signal reception unit or the second optical signal reception unit includes a signal transmission circuit for outputting an electric signal obtained by photoelectric conversion in the light receiving unit to a subsequent stage, and a receiving level detection circuit for detecting a strength of the optical signal, and
when the receiving level detection circuit determines that the strength of the optical signal is less than a predetermined reference level, the signal transmission circuit stops transmission of the electric signal to the subsequent stage.

6. The optical data transmission apparatus according to claim 5, wherein the receiving level detection circuit is structured to light a light-emitting device for light-emission strength monitoring when the strength of the optical signal is higher than the predetermined reference level, and the light-emitting device is arranged at a position visible from a front surface side of a casing of the apparatus so that the light-emitting device serves as a monitor for positioning the first communication unit or the second communication unit.

7. The optical data transmission apparatus according to claim 5, wherein, to a servo communication system including a plurality of servo control units for controlling servo motors, connected by a multi-drop method to a full-duplex communication line connected to a system control apparatus, in which each of the servo control units controls the corresponding servo motor upon receiving a control instruction from the system control apparatus via the communication line, and transmits a control state thereof to the system control apparatus via the communication line, the first communication unit and the second communication unit are interposed between the communication line and the servo control unit so as to optically transmit data transmitted via the communication line.

8. An optical data transmission apparatus comprising communication units arranged to face each other in such a manner to be movable relatively to each other, each of the communication units including:
a light emitting unit having a laser diode for emitting single-mode light;
a multi-mode optical fiber for guiding a single-mode optical signal output from the light emitting unit, converting the single-mode optical signal into a multi-mode optical signal, and outputting the multi-mode optical signal;
an optical lens for forming the optical signal output from the multi-mode optical fiber into parallel light; and
a polarization element for passing the optical signal polarized in a predetermined direction out of optical signals output from the optical lens.

9. The optical data transmission apparatus according to claim 8, wherein an output end section of the multi-mode optical fiber is arranged on an optical axis at a focal position of the optical lens so as to face the optical lens.

* * * * *